United States Patent
Cordier et al.

(10) Patent No.: US 6,765,897 B2
(45) Date of Patent: *Jul. 20, 2004

(54) DOWNLINK POWER CONTROL METHOD AND CELLULAR NETWORK USING THIS METHOD

(75) Inventors: Christophe Cordier, Paris (FR); Alejandro De Hoz Garcia-Bellido, Boulogne-Billancourt (FR)

(73) Assignee: Alcatel, Paris (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/360,635

(22) Filed: Jul. 26, 1999

(65) Prior Publication Data

US 2003/0099222 A1 May 29, 2003

(30) Foreign Application Priority Data

Jun. 18, 1999 (EP) .............................. 99440157

(51) Int. Cl.⁷ .............................................. H04B 7/216
(52) U.S. Cl. ...................... 370/342; 455/522; 455/69; 370/311; 370/335
(58) Field of Search .................. 455/522, 69; 370/318, 370/320, 311, 335, 342

(56) References Cited

U.S. PATENT DOCUMENTS

| | | | | |
|---|---|---|---|---|
| 5,604,730 A | * | 2/1997 | Tiedemann | 370/252 |
| 6,061,339 A | * | 5/2000 | Nieczyporowicz et al. | 370/335 |
| 6,085,107 A | * | 7/2000 | Persson et al. | 455/522 |
| 6,085,108 A | * | 7/2000 | Knutsson et al. | 455/69 |
| 6,104,933 A | * | 8/2000 | Frodigh et al. | 455/522 |
| 6,144,861 A | * | 11/2000 | Sundelin et al. | 455/522 |
| 6,160,999 A | * | 12/2000 | Chheda et al. | 455/69 |
| 6,259,927 B1 | * | 7/2001 | Butovitsch et al. | 455/522 |
| 6,272,354 B1 | * | 8/2001 | Saario | 455/522 |
| 6,285,664 B1 | * | 9/2001 | Bernstein et al. | 370/318 |
| 6,317,435 B1 | * | 11/2001 | Tiedemann, Jr. et al. | 370/441 |
| 6,463,044 B1 | * | 10/2002 | Seo | 370/329 |

FOREIGN PATENT DOCUMENTS

| | | | | |
|---|---|---|---|---|
| WO | WO 97/07600 | * | 2/1997 | H04B/7/005 |
| WO | WO 99/31819 | | 6/1999 | |

* cited by examiner

*Primary Examiner*—William Trost
*Assistant Examiner*—Sharad Rampuria
(74) *Attorney, Agent, or Firm*—Sughrue Mion, PLLC

(57) ABSTRACT

The present invention concerns a downlink power control method for adjusting, in a cellular radiocommunication network, the power transmitted by base stations (BS), received with at least a preset minimal power level by a given mobile terminal (MT), towards said mobile terminal (MT), consisting in adjusting, preferably repeatedly, the downlink power level of each of said base stations (BS) according to a specific power distribution criterion, while ensuring a desired communication quality level at said mobile terminal (MT).

4 Claims, 1 Drawing Sheet

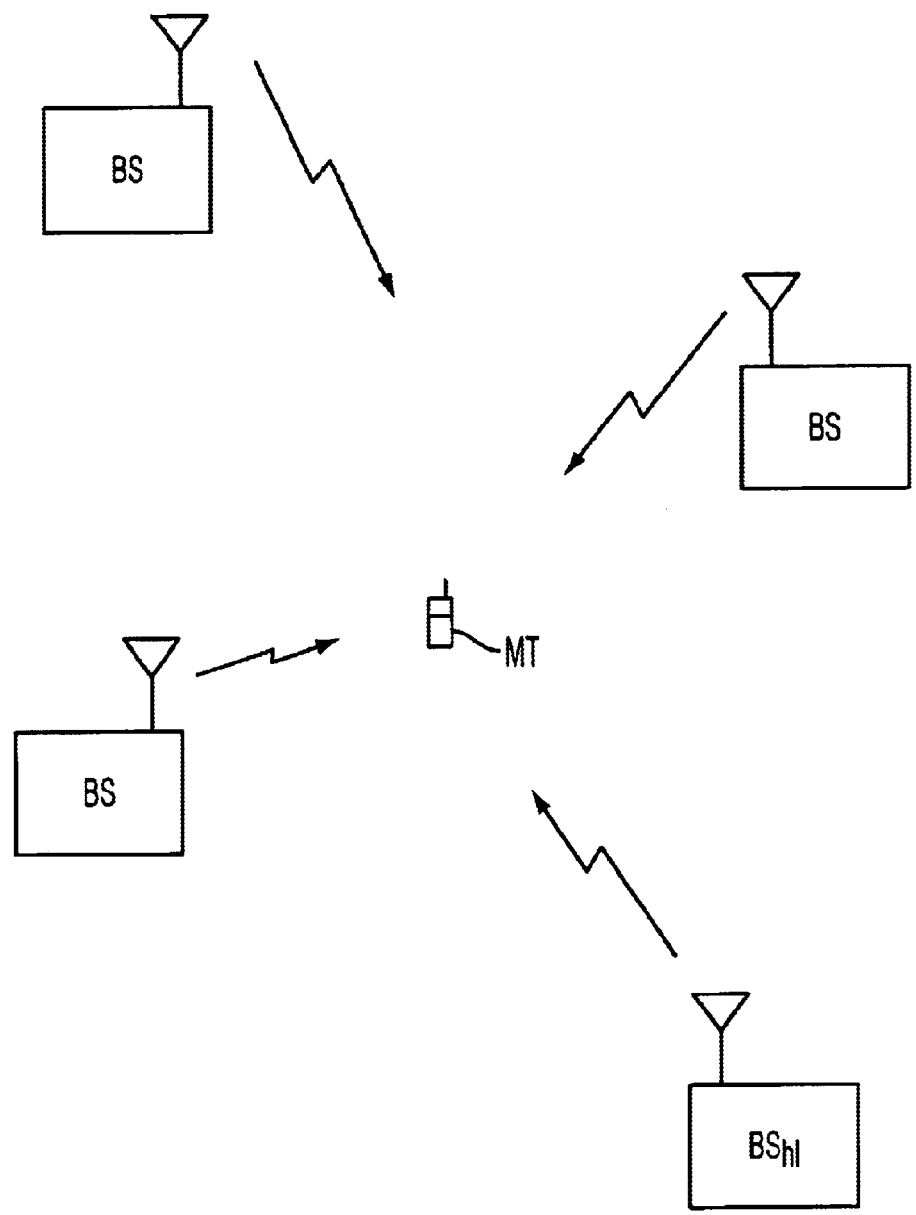
FIGURE

DOWNLINK POWER CONTROL METHOD AND CELLULAR NETWORK USING THIS METHOD

BACKGROUND OF THE INVENTION

The present invention relates generally to radiocommunication networks, more particularly to transmission power adjustment in such networks, and concerns a downlink power control method and a cellular network applying this method.

In cellular radiocommunication networks, there exists in particular a constant need to increase capacity and to minimise the injected power for a requested signal to interference ratio (SIR) at the level of the mobile terminals.

This is particularly the case in a CDMA (Code Division Multiple Access) type network, wherein to each mobile terminal is allocated a so-called Active Set composed of the base stations received with at least a minimal power level at the mobile terminal and able to establish communication of a given quality with the latter.

In this type of networks in particular, when a mobile terminal is in handover with more than one base-station (i.e. during macrodiversity mode), this mobile presently measures the overall Eb/Io (received from all base-stations in the Active Set) and derives a single TPC (Transmit Power Control) command which is forwarded to all those base-stations in the Active Set. As a result, all these base-stations will adjust their power contribution towards the mobile following the same TPC indication (resulting in an increase/decrease of transmit power), i.e. base-stations in the Active Set always react in unison to power requests of the mobile. In particular, with such a power control scheme, power ratios between active base-stations remain constant along communication.

In practice, using single TPC commands for all base-stations connected to a mobile has shown some major drawbacks.

According to the preceding existing scheme, power distribution among active links is set for good at power initialization: once a base-station has been added to the Active Set, the fraction of power directed to the mobile by this base, as compared to the contribution of bases present in the Active set, cannot change until Active Set composition is modified.

Still, even if the Active Set is subject to modifications, the new power fraction will be determined by the addition/removal of bases in the Active Set: there is no way to control exactly the fraction of power contributed by the base. Besides, power initialization for a newly added link in a non-vacant Active Set is not covered by existing solutions.

Even considering that power initialization provides an optimum power share for the newly added link, permanency of this situation is not guaranteed. In effect, pathloss and cell-load conditions are subject to frequent changes, which requires to alter power distribution within the Active Set so as to maintain optimality. On top of this, errors in the transmission of the TPC commands might unduly modify the power share of a given link.

Sending multiple TPC commands (one for each base of the Active Set) would enable to control the power of each link independently, but is merely impractical as it would significantly increase the signalling amount on the radio interface, leading to a reduction in capacity.

In any case, the mobile station is not in a position to decide how the power should be distributed among the base-stations of the Active Set.

Hence, a slow power regulation mechanism capable of interacting with fast-power control (and possibly overruling it) is strongly needed to overcome these limitations. Preferably implemented in a supervisory entity of the network, this procedure should be in charge of updating and controlling link power allocation within the Active Set, taking possibly also into account cell-specific conditions such as loading.

SUMMARY OF THE INVENTION

It is therefore a main object of the present invention to overcome the aforementioned limitations and to meet the needs expressed herebefore.

The present invention thus concerns a power control method for adjusting, in a cellular radiocommunication network, the power transmitted by base stations BS, received with at least a preset minimal power level by a given mobile terminal MT (active set of MT), towards said mobile terminal MT, consisting in adjusting individually, preferably repeatedly, the downlink power level of each of said base stations BS according to a specific power distribution criterion, while ensuring a desired communication quality level at said mobile terminal (MT).

For example, the downlink power level of each of the base stations of the active set can be adjusted, each time, in such a way that said base stations BS are contributing approximately equally in order to reach a desired communication quality level at said mobile terminal MT.

Especially in case of a CDMA cellular network, the downlink power of each base station BS of the active set is adjusted so that each base station BS has about the same contribution in terms of the received Eb/Io (Energy per chip/Interference spectral density) at the considered mobile terminal MT.

The invention can provide additionnaly that, if one $BS_{hl}$ of the base stations BS of the active set of the considered mobile terminal MT is affected by heavy loading conditions compared to the other base stations BS of said set, the contribution of said base station $BS_{hl}$ to the received Eb/Io at the mobile terminal MT is reduced by a quantity function of its loading difference with the other base stations BS, the reduction quantity being approximately equally distributed among these latters.

The balancing procedure of the power distribution of the base stations of the active set of a mobile terminal is preferably repeated intermittently and, for example, the power adjustment procedure can be carried out periodically and/or each time the active set of said mobile terminal MT is modified.

As can be seen, a separate procedure is established to update downlink power distribution within the Active Set. This procedure complements fast power-control and is preferably carried out in the Radio Network Controller (RNC). It is advantageously activated upon every change in the Active Set and periodically between Active Set modifications. The goal of this procedure is to ensure an efficient power allocation within the Active Set, especially during macrodiversity periods.

The present invention also concerns a cellular radiocommunication network comprising a plurality of geographically spread base stations BS able to establish communication channels with mobile terminals MT, the said base stations BS belonging to different sets based on the power levels received at the different mobile terminals MT, wherein said network also comprises a controller which supervises power allocation in all base stations of the network and controls downlink power in each of said so-called active sets, said controller determining the downlink power transmitted by each base station BS of each active set according to the method described herebefore.

BRIEF DESCRIPTION OF THE DRAWING

The FIGURE schematically shows a cellular radiocommunication network implementing a method according to an exemplary embodiment of the present invention.

The present invention will be better understood thanks to the following detailed description based on a preferred embodiment explained hereinafter as a non limitative example.

In particular in a CDMA type network, the RNC is in charge of Active Set maintenance for all mobiles in its control zone. Moreover, it supervises power allocation in all bases it is controlling. Whenever deemed necessary, the RNC will intervene to modify the transmit power towards a given mobile in a given base. This new power value will serve as a basis for subsequent fast power-control actions.

For a given mobile, when the Active Set undergoes any modification (addition/removal/replacement of a basestation), the RNC determines the transmit power from every base of the newt Active Set to the mobile. This task encompasses power initialization for new links and power update for existing links, considering Active Set size and internal constraints of each cell (e.g. loading). Moreover, after Active Set changes, power updates are accomplished by the RNC with appropriate intervals, according to the same criteria, so as to maintain a proper power distribution within the Active Set along communication.

At every step of the power regulation procedure, one criterion for evaluating relative transmit power values is to assure the same, or approximately the same, contribution in terms of Eb/Io from each active link.

In effect, during macrodiversity, the mobile performs maximum ratio combining of all incoming signals. The resulting Eb/Io measured for TPC command evaluation is the summation of all the individual Eb/No corresponding to each link. Hence, the contribution of a given link to overall quality can be measured by its individual Eb/Io.

One method for assigning power among links is equal Eb/Io sharing, i.e. all links provide the same individual Eb/Io. Assuming that the Active Set comprises N basestations, then each link should contribute an Eb/No of $1/N \times [E_b/I_o]_{th}$, where $[E_b/I_o]_{th}$ denotes the required Eb/Io at the mobile.

To this end, a power initialization procedure as described in European patent application entitled "Method for determining the needed transmission power in a CDMA network" filed this day by the same applicant and applied with $SIR_{th}/N$ as target SIR, can be used. It should be noted that the aforementioned target SIR may depend of N to account for the macrodiversity gain.

This scheme is to be slightly adapted depending on cell-loading constraints in each cell. Should one of the cells be excessively loaded, the target Eb/Io for some links should decrease, this decrease being compensated by an equivalent increase for corresponding links sustained by base-stations experimenting more favorable cell-loading conditions.

Let us consider a mobile whose Active Set comprises N base-stations, one of which is affected by a heavy load. In this particular case, the target Eb/Io for the disadvantaged link should be $1/N \times [E_b/I_o]_{th} - \Delta$, while the target $1/N \times [E_b/I_o]_{th} + \Delta/N-1$ should apply to the other links, $\Delta$ being quantified depending on the difference of loading conditions between the particular base station and the other base stations of the Active Set.

With the inventive solution, a centralized power regulation capability is introduced. This is a powerful means of managing power allocation for the whole radio network. In particular, information such as relative cell-loading solely available in the RNC can be utilized to optimize power distribution in the network. By means of individual link power control complementing (local) fast power-control, transparent and prompt adaptation to changing interference and load conditions is provided.

The equal sharing criterion allows maximization of the macrodiversity gain, thereby minimizing the amount of power injected in the system to meet quality requirements. Combined with a more efficient power utilization, this ultimately leads to a capacity increase for the system in the downlink.

Individualized link quality control also guarantees reliability of TPC commands transmitted on the downlink for uplink power control purposes.

The present invention is, of course, not limited to the preferred embodiment described herein, changes can be made or equivalents used without departing from the scope of the invention.

What is claimed is:

1. A power control method for adjusting, in a cellular CMDA radiocommunication network, the power of downlink transmissions from an active set of base stations (BS), the downlink transmissions being received with at least a preset minimal power level by a mobile terminal (MT), comprising:

providing respective downlink transmissions from each of the base stations (BS) in the active set to the mobile terminal; and adjusting individually, the downlink power level of each of the base stations (BS) in the active set based on characteristics of the respective downlink transmissions received by the mobile terminal and according to a specific power distribution criterion, wherein the downlink power level of each of the base stations (BS) in the active set is adjusted such that the base stations (BS) are contributing approximately equally in terms of a received Eb/Io at the mobile terminal (MT), and wherein, if one base station ($BS_{h1}$) of the base stations (BS) in the active set is affected by heavy loading conditions as compared to the loading conditions of the other base stations (BS) in the active set, then the contribution of the one base station ($BS_{h1}$) to the received Eb/Io at the mobile terminal is reduced by a quantity that is a function of a loading difference between the one base station ($BS_{h1}$) and the other base stations (BS), the quantity being approximately equally distributed among the other base stations (BS).

2. The power control method according to claim 1, wherein the power adjustment is performed periodically.

3. The power control method according to claim 1, wherein the power adjustment is performed each time the active set of the mobile terminal (MT) is modified.

4. A cellular CMDA radiocommunication network comprising:

a plurality of geographically spread base stations (BS) able to establish communication channels with mobile terminals (MT), the base stations (BS) belonging to different active sets based on the power levels received at the mobile terminals (MT); and a controller which supervises power allocation in all base stations of the network and controls downlink power in each of the active sets, the controller determining the downlink power transmitted by each base station (BS) of each active set according to the method of claim 1.

* * * * *